(12) United States Patent
Tan

(10) Patent No.: US 12,487,706 B1
(45) Date of Patent: Dec. 2, 2025

(54) ADC DATA PROCESSING CIRCUIT FOR TOUCH CONTROLLERS

(71) Applicant: STMicroelectronics International N.V., Geneva (CH)

(72) Inventor: Tong Tee Tan, Singapore (SG)

( * ) Notice: Subject to any disclaimer, the term of this patent is extended or adjusted under 35 U.S.C. 154(b) by 0 days.

(21) Appl. No.: 18/969,917

(22) Filed: Dec. 5, 2024

(51) Int. Cl.
*G06F 3/041* (2006.01)

(52) U.S. Cl.
CPC ........ *G06F 3/0418* (2013.01); *G06F 3/04166* (2019.05)

(58) Field of Classification Search
CPC .............. G06F 3/0418; G06F 3/04166
See application file for complete search history.

(56) References Cited

U.S. PATENT DOCUMENTS

| | | | |
|---|---|---|---|
| 9,900,028 B1 | 2/2018 | Shan | |
| 10,845,901 B2* | 11/2020 | Shahparnia | G06F 3/0442 |
| 2014/0240256 A1 | 8/2014 | Kim | |
| 2017/0040977 A1 | 2/2017 | Heim | |
| 2017/0070952 A1 | 3/2017 | Balakrishnan | |
| 2017/0176225 A1 | 6/2017 | Fontes | |

* cited by examiner

*Primary Examiner* — Michael Pervan
(74) *Attorney, Agent, or Firm* — Slater Matsil, LLP

(57) ABSTRACT

According to an embodiment, a signal processing circuit includes a coefficient accumulator and dual multiplexer paths for handling invalid ADC samples in touch controllers. When ADC samples exceed a saturation threshold, the circuit selects zero values through one multiplexer while accumulating coefficients through another multiplexer path. Upon receiving a first valid sample, the circuit multiplies it with accumulated coefficients before resuming normal coefficient processing. The architecture enables continuous processing across multiple touch sensor channels without buffering requirements while maintaining mathematical equivalence through the distributive property of multiplication.

20 Claims, 5 Drawing Sheets

ADC DATA PROCESSING CIRCUIT FOR TOUCH CONTROLLERS

TECHNICAL FIELD

The present disclosure generally relates to signal processing architectures and, in particular embodiments, to multiply-accumulate circuits for processing invalid touch sensor data in multi-channel touch screen controllers.

BACKGROUND

Touch screen systems employ matrix-arranged sensing elements that detect user interactions through capacitive sensing techniques. When a conductive object, such as a finger or stylus, alters the capacitive field of the sensing elements, these systems generate analog signals. The signals are processed through analog-to-digital converters (ADCs) to generate digital data suitable for processing by touch screen controllers.

Modern touch screen controllers process data from multiple sensing channels simultaneously. Each channel provides a continuous stream of ADC samples representing the capacitive measurements from different locations on the touch sensor matrix. The ADC samples typically have defined resolution limits, such as 8-bit values ranging from 0 to 256, where values approaching the maximum can indicate signal saturation.

Touch screen systems operate in environments where various interference sources can affect signal integrity. Wireless charging systems, for example, generate electromagnetic fields that can induce signal distortion in the touch sensor readings. When such interference occurs, the affected ADC samples may reach saturation levels, producing invalid data points in the digital signal stream. In multi-channel touch detection systems, the processing architecture maintains consistent sampling and processing rates across all channels to ensure accurate touch position detection.

SUMMARY

Technical advantages are generally achieved by embodiments of this disclosure, which describe multiply-accumulate circuits for processing invalid touch sensor data in multi-channel touch screen controllers.

A first aspect relates to a method for continuous processing of signals in a touch controller, the method comprising receiving analog-to-digital converter (ADC) samples from multiple parallel channels; comparing, for each channel, each ADC sample to a saturation threshold to determine validity; in response to detecting, for each channel, initial ADC samples exceeding the saturation threshold: selecting a zero value for multiplication to maintain continuous processing without buffering, and accumulating coefficient values in a coefficient accumulator; in response to detecting, for each channel, a first valid ADC sample below the saturation threshold: selecting the first valid ADC sample for multiplication, and selecting an accumulated coefficient value from the coefficient accumulator to recover processing from the initial invalid samples; and performing multiplication using the first valid ADC sample and the accumulated coefficient value to maintain equivalence through a distributive property.

A second aspect relates to a touch sensing system, comprising a touch sensor configured to sense inputs to a touch screen; and a touch controller coupled to receive sensed inputs from the touch sensor, the touch controller comprising first and second processing circuits, each processing circuit comprising a coefficient input node configured to receive coefficient values; a coefficient accumulator; a first multiplexer having a first input coupled to the coefficient input node, a second input coupled to an output of the coefficient accumulator, a selection input coupled to receive an ADC validity signal; an ADC input node coupled to receive the sensed inputs; a second multiplexer having a first input coupled to the ADC input node, a second input coupled to a zero value source, a selection input coupled to receive the ADC validity signal; and a multiplication circuit having a first input coupled to an output of the first multiplexer, and a second input coupled to an output of the second multiplexer, wherein the first processing circuit provides coefficient values for determining a magnitude of the sensed inputs and the second processing circuit provides coefficient values for determining a phase of the sensed inputs.

A third aspect relates to a circuit for processing ADC samples, the circuit comprising a coefficient input node configured to receive coefficient values; a coefficient accumulator; a first multiplexer having a first input coupled to the coefficient input node, a second input coupled to an output of the coefficient accumulator, and a selection input coupled to receive an ADC validity signal; an ADC input node providing ADC samples; a second multiplexer having a first input coupled to the ADC input node, a second input coupled to a zero value source, and a selection input coupled to receive the ADC validity signal; and a multiplication circuit having a first input coupled to an output of the first multiplexer, and a second input coupled to an output of the second multiplexer, wherein the selection inputs control the first multiplexer and the second multiplexer to select a zero value and coefficient values when the ADC validity signal indicates an invalid sample, and select a first valid ADC sample and the accumulated coefficient value when the ADC validity signal indicates a first valid sample.

Embodiments can be implemented in hardware, software, or any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

Figure 1:
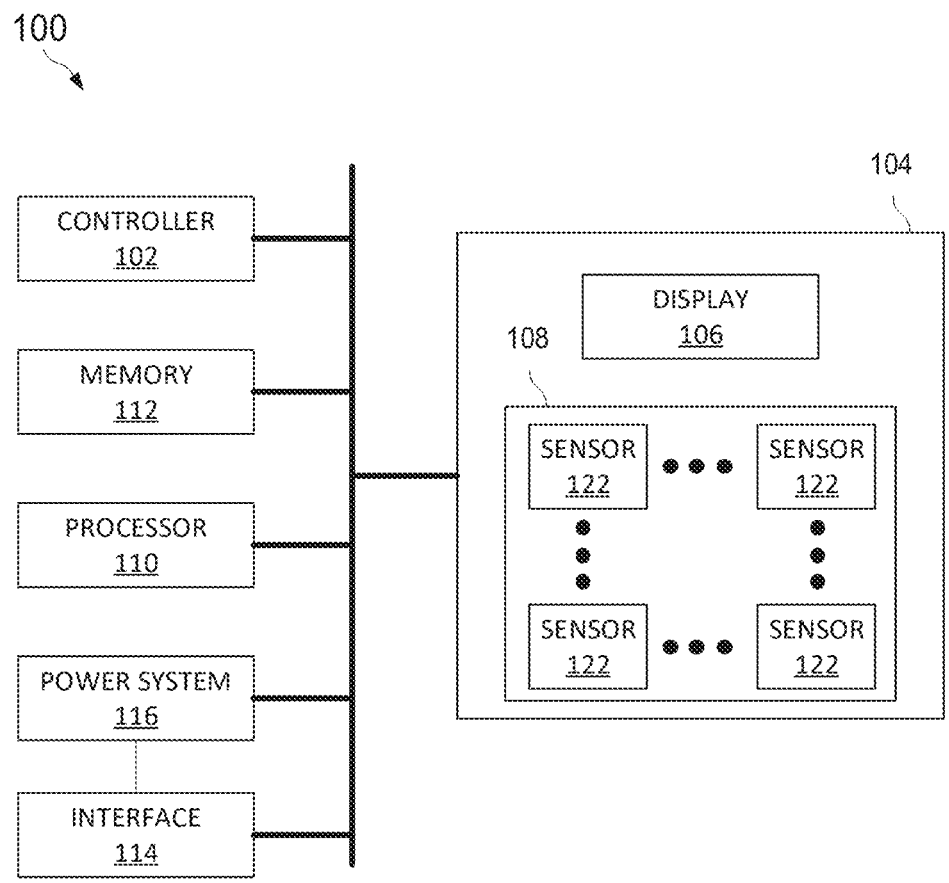
FIG. 1 is a block diagram of an embodiment device.

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise. Various embodiments are illustrated in the accompanying drawing figures, where identical components and elements are identified by the same reference number, and repetitive descriptions are omitted for brevity.

Variations or modifications described in one of the embodiments may also apply to others. Further, various changes, substitutions, and alterations can be made herein without departing from the spirit and scope of this disclosure as defined by the appended claims.

While the inventive aspects are described primarily in the context of touch screen controllers processing capacitive sensor signals, it should also be appreciated that these inventive aspects may also apply to other signal processing applications requiring parallel data stream handling. In particular, aspects of this disclosure may similarly apply to digital signal processing systems where input data streams may contain invalid or saturated samples requiring continuous processing without buffering delays.

In accordance with various embodiments, a signal processing architecture handles invalid analog-to-digital converter (ADC) samples through a multiply-accumulate circuit (MAC) incorporating dual multiplexer paths. A first multiplexer selects between direct coefficient values and accumulated coefficient values, while a second multiplexer selects between ADC input samples and zero values. The architecture determines sample validity by comparing ADC values against a saturation threshold, such as 254 for 8-bit conversion.

In one or more embodiments, the architecture simultaneously processes data from multiple channels (e.g., 44 channels). Each channel provides continuous ADC samples representing capacitive measurements from different locations on the touch sensor matrix. When wireless charging or other interference sources cause signal saturation, affected channels may produce invalid ADC samples while other channels provide valid data.

In various embodiments, when ADC samples are valid, the circuit processes data by selecting them through one multiplexer path and directing coefficient values through the other path for multiplication. During periods of invalid data, the circuit maintains continuous operation by selecting zero values for multiplication while accumulating coefficients in parallel. This approach allows processing to continue without requiring large data buffers or introducing delays.

The architecture provides particular advantages when handling initially invalid data samples. Rather than stalling until valid data becomes available, the circuit accumulates coefficients during invalid periods. When the first valid sample arrives, the circuit multiplies that sample with the accumulated coefficients. Following this first valid sample multiplication, the circuit transitions to regular operation using individual coefficient values for subsequent samples.

In one or more embodiments, the architecture may implement in-phase and quadrature (IQ) signal processing using sine and cosine coefficients. Based on hardware requirements, the coefficient values may be normalized within 8-bit or 9-bit representations. This implementation uses two parallel multiply-accumulate circuits: one processes the in-phase component with sine coefficients and another processes the quadrature component with cosine coefficients.

The multiply-accumulate architecture enables continuous processing across all channels without pausing or buffering when invalid samples occur. For channels experiencing signal saturation, the circuit maintains operation through zero substitution while preserving coefficient information through accumulation. When valid data returns, the circuit seamlessly incorporates the accumulated coefficients to maintain signal processing accuracy.

The architecture eliminates the need to buffer samples or pause processing by handling invalid data through coefficient accumulation and zero substitution. This approach proves particularly valuable in multi-channel applications where some channels may experience temporary signal saturation while others continue providing valid data. The circuit maintains consistent processing rates while efficiently managing the transition between invalid and valid data conditions. These and additional details are further disclosed below.

FIG. 1 illustrates a block diagram of an embodiment device 100. Device 100 includes a touch controller 102, a touch screen 104, a processor 110, a memory 112, an interface 114, and a power system 116, which may (or may not) be arranged as shown. Device 100 may include additional components not depicted, such as long-term storage (e.g., non-volatile memory, etc.), additional input and output interfaces, sensors, speakers, or the like.

In embodiments, device 100 is a smartphone, smartwatch, wearable device, tablet, laptop, gaming device, personal computer, or any other stylus-enabled device that includes a grid-type sensor, such as a touch screen device.

In embodiments, touch controller 102 is arranged on a System-on-Chip (SoC). Touch controller 102 may be any component or collection of components adapted to perform computations or other signal processing-related tasks. In embodiments, during regular operation, touch controller 102 controls the operation of touch screen 104. For example, in some embodiments, touch controller 102 receives raw input data from the touch screen 104 to determine the location and the type of touch.

Processor 110 is configured to operate device 100. In embodiments, processor 110 is implemented as a general-purpose, custom controller, host processor, or application processor coupled to memory 112 and configured to execute instructions from memory 112 or another memory of device 100.

In embodiments, processor no may be coupled to a second memory of device 100, which stores the instructions to be executed by processor 110. In some embodiments, touch controller 102 is implemented as part of processor 110. In embodiments, processor 110 is a primary processing unit, and touch controller 102 is an auxiliary processing unit. In embodiments, the touch controller 102 and the processor no may be implemented as a single processing unit.

Memory 112 may be any component or collection of components adapted to store programming or instructions for execution by touch controller 102, the processor no, or both. In an embodiment, memory 112 includes a non-transitory computer-readable medium. In some embodiments, memory 112 is part of processor no. In some embodiments, memory 112 is external to processor no, such as inside the touch controller 102. Other implementations are also possible. In some embodiments, memory 112 may also store other data types.

Interface 114 may be any component or collection of components that allow device 100 to communicate with other devices/components or a user. For example, interface 114 may be adapted to receive wireless power from an external source using a transceiver circuit and antennas. Further, interface 114 may include circuitry that allows device 100 to communicate signals externally or internally within the device 100, a user, or a stylus.

In embodiments, touch screen 104 allows users to interact and communicate with the device 100 using touch or a stylus. In embodiments, touch screen 104 includes a display layer 106 and a touch-sensing layer 108.

The display layer 106 is configured to display images. In embodiments, a panel driver (not shown) may be coupled to the display layer 106 and the processor 110. The panel driver may be used to drive the display layer 106. The display layer 106 may incorporate one or more display technologies, such as a light-emitting diode (LED) display, an organic LED (OLED) display, a liquid crystal display (LCD), or an active-matrix organic LED (AMOLED) display.

The touch-sensing layer 108 can include an array of sensors arranged as a grid (e.g., a touch grid, touch cells, or sensing elements). For example, the touch-sensing layer 108 can include a plurality of sensors 122 arranged in rows and columns. Sensors 122 and the touch-sensing layer 108 may be implemented in any way known in the art. In embodiments, touch screen 104 is capacitive. In embodiments, the sensors 122 in the touch-sensing layer 108 can detect the voltage modulations from a stylus, which couples to the sensor electrodes.

The touch-sensing layer 108 can register user input via touches made to the surface of the display layer 106. It may also be configured to detect input from other sources, such as a stylus (active or passive) device. In embodiments, the touch screen 104 may include sensors such as gyroscopes or accelerometers. One or more of these sensors may be integrated.

In embodiments, touch screen 104 may be configured to receive image data to be displayed on the display layer 106. In various embodiments, touch controller 102 and touch-sensing layer 108 may be configured to operate based on mutual capacitance sensing techniques, self-capacitive sensing techniques, or a combination thereof.

Generally, touch screen devices, such as device 100, utilize two sensing methods to detect touch: mutual capacitive and self-capacitive. Mutual capacitive sensing, or mutual sensing data, refers to a touch screen technology where touch detection is based on measuring the capacitance between two sensors, usually arranged in a grid of rows and columns. In this system, one sensor (the transmitter) emits a signal, and the corresponding change in capacitance is detected by the other sensor (the receiver). When a finger or a stylus approaches or touches the display layer 106, it interferes with the electric field between the sensors of the touch-sensing layer 108, changing the mutual capacitance at that point, which is then detected by the system. For stylus detection, touch controller 102 can use the sensor electrodes to detect the voltage modulations from, for example, the dual transmitters of a stylus, which allow for precise position computation.

Mutual capacitive sensing's primary advantage is its ability to accurately detect and track multiple touch points, allowing advanced multi-touch functionalities. Due to its high resolution and precision in detecting touch inputs, which are used in modern touch screens, it is suitable for applications requiring complex gestures and interactions.

Conversely, self-capacitive sensing, or self-sensing data, involves detecting touch based on the change in capacitance of individual sensors of the touch-sensing layer 108. This method measures the capacitance between each sensor and the ground. When a finger or a stylus is near or touching the display layer 106, it acts as a conductive object, altering the self-capacitance of the sensor in the touch-sensing layer 108, which the system recognizes as a touch.

Self-capacitance faces challenges in distinguishing between multiple simultaneous touches. At the same time, mutual capacitance is better suited for multi-touch detection, as each row and column intersection can be measured independently. However, self-capacitance excels in applications where simple touch interactions are sufficient, and cost-effectiveness is a priority. Further, self-capacitance is generally more sensitive to conductive objects and can detect proximity from a greater distance, but it may be more susceptible to noise and interference. While less sensitive than self-capacitance, mutual capacitance is generally more precise and less prone to noise and interference.

Power system 116 provides a power source for the operation and portability of device 100. Power system 116 may be a power management integrated circuit (PMIC). Power system 116 may include a controller, a battery, a charging circuit, an interface, and other components to allow inductive charging by transferring power from a charging pad or a base station to the device 100. The power system 116 may be any component or collection that manages and controls power distribution, conversion, and regulation in the device 100. In various embodiments, power system 116 is configured to regulate supply voltage to various components of device 100 and control the charging, discharging, and monitoring of the operations of a battery.

In embodiments, touch controller 102 receives analog signals from the touch-sensing layer 108, representing touch or stylus interactions across the sensor grid. The touch controller 102 converts these signals to digital data through analog-to-digital conversion for subsequent processing. Due to the matrix arrangement of sensors 122 in the touch-sensing layer 108, the touch controller 102 can process multiple signal channels in parallel to maintain touch system responsiveness.

In embodiments, external interference sources may cause signal distortion in some channels of the touch-sensing layer 108. When distortion occurs, the affected digital samples may need to be identified and replaced with valid data to maintain continuous signal processing. The touch controller 102 can simultaneously process valid and invalid samples across different channels, as interference patterns may affect various portions of the touch-sensing layer 108 differently.

In embodiments where later samples in a channel are valid, the touch controller 102 can replace distorted samples with subsequent valid data. However, when initial samples from a channel are distorted, no previous valid data exists for replacement. Traditional handling of such scenarios may require the touch controller 102 to pause processing or implement substantial data buffering. In multi-channel implementations, where different channels may experience varying patterns of signal distortion, significant hardware resources may be needed to buffer valid data while waiting for all channels to provide valid samples.

In accordance with various embodiments, ADC samples from touch sensors exhibit different characteristics under normal and distorted conditions. Under normal operation, ADC samples form a periodic pattern of varying amplitudes within the ADC's operating range, representing valid touch or stylus interactions detected by the touch-sensing layer.

The ADC samples may become distorted when interference occurs, such as from wireless charging operations. This distortion can manifest as signal saturation, where affected samples reach maximum ADC values, significantly deviating from the expected periodic pattern. Such saturation represents invalid data that cannot be used for accurate touch detection.

Conventional approaches to handling such distorted signals require buffering valid data from unaffected channels while waiting for distorted channels to provide valid samples. The buffering requirement grows larger when channels experience consecutive distorted samples, increasing hardware complexity. Further, processing delays occur as operations pause until all channels provide valid data.

In embodiments, a proposed signal processing approach employs multiplexer-based signal processing to handle distorted samples without buffering requirements. When initial samples are distorted, the processing path substitutes zero values for the invalid ADC data while accumulating coefficient values. Upon detecting the first valid ADC sample, the accumulated coefficients are applied to it. The processing transitions to regular operation for subsequent valid samples, maintaining continuous operation without requiring additional buffer storage.

Figure 2:
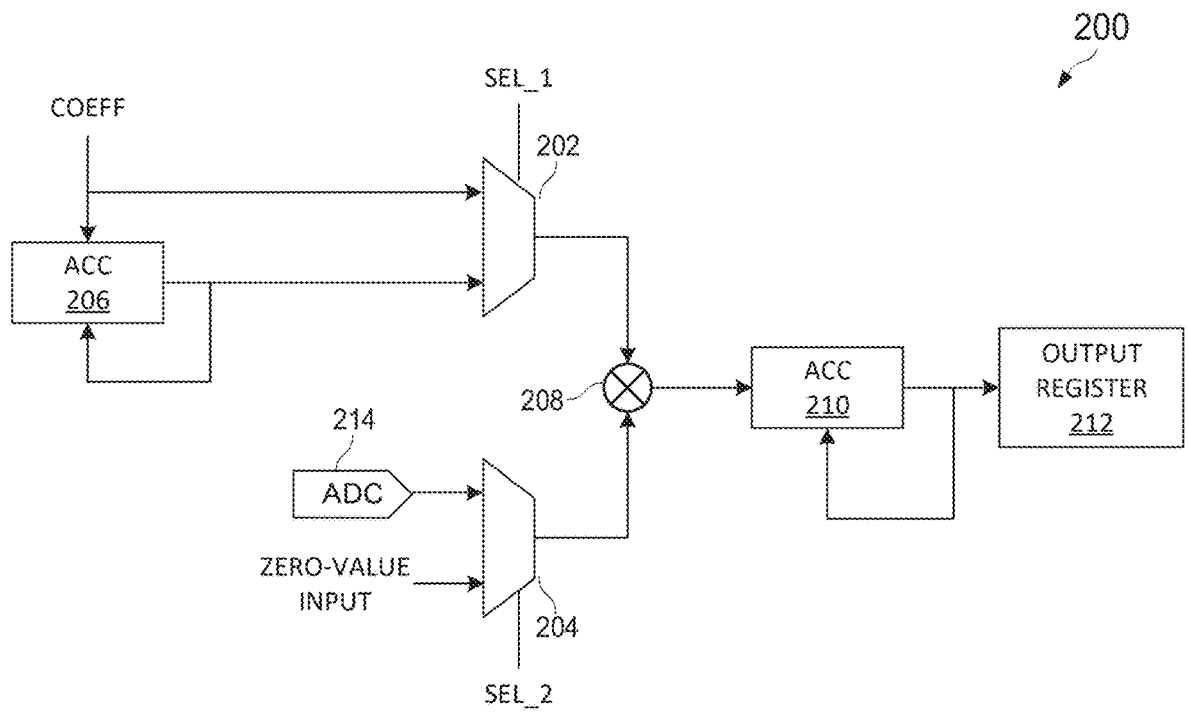
FIG. 2 is a block diagram of an embodiment circuit.

FIG. 2 illustrates a block diagram of an embodiment circuit 200. Circuit 200 includes a first multiplexer 202, a second multiplexer 204, a coefficient accumulator 206, a multiplier 208, an accumulator 210, and an output register 212, which may (or may not) be arranged as shown. Circuit 200 receives coefficient values, ADC data, and a zero-value input.

In embodiments, circuit 200 efficiently handles invalid ADC samples without requiring data buffering or processing delays. During periods of invalid data, the circuit maintains continuous operation through two parallel processes: accumulating coefficient values in coefficient accumulator 206 while simultaneously performing zero-value multiplications in multiplier 208.

When valid data becomes available, the circuit recovers the signal processing by applying the accumulated coefficients to the first valid sample, effectively capturing the mathematical operations that would have occurred during the invalid period. After processing this first valid sample with accumulated coefficients, the circuit seamlessly transitions back to normal operation, selecting individual coefficient values for subsequent valid samples. This architecture eliminates the need for large data buffers while preserving signal processing accuracy through the distributive property of multiplication.

In various embodiments, circuit 200 operates in different modes depending on the validity of initial ADC samples. When processing begins with valid data below the saturation threshold, the circuit operates straightforwardly. The first multiplexer 202 selects the direct coefficient path while the second multiplexer 204 selects the ADC data input. Under these conditions, multiplier 208 processes each coefficient and ADC sample pair directly, and accumulator 210 maintains a running sum of the products.

When initial ADC samples are invalid due to saturation, circuit 200 enters a different operating mode. The second multiplexer 204 selects the zero-value input, while coefficient accumulator 206 begins summing consecutive coefficient values. During this period, multiplier 208 produces zero outputs due to the zero-value selection, while the coefficient information is preserved through accumulation.

Upon detecting the first valid ADC sample below the threshold, circuit 200 performs a recovery operation. The second multiplexer 204 switches to select the valid ADC data, while the first multiplexer 202 selects the accumulated coefficient path from coefficient accumulator 206. This allows multiplier 208 to combine all accumulated coefficients with the first valid ADC sample in a single operation, effectively recovering the signal processing that would have occurred during the invalid period.

After processing the first valid sample with accumulated coefficients, circuit 200 transitions back to normal operation. The first multiplexer 202 returns to selecting the direct coefficient path, while the second multiplexer 204 continues selecting the ADC data input. This enables standard multiply-accumulate processing for all subsequent valid samples, maintaining efficient operation until another invalid sample period is detected.

As shown, the output of the first multiplexer 202 is coupled to a first input of multiplier 208, while the output of the second multiplexer 204 is coupled to a second input of multiplier 208. The output of the multiplier 208 is coupled to accumulator 210, which in turn is coupled to output register 212.

In embodiments processing multiple parallel channels, each channel may implement an instance of circuit 200. The channels can operate independently, allowing some channels to process valid data normally while others handle invalid data through coefficient accumulation and zero substitution. The independent operation enables consistent processing rates across all channels without requiring synchronization or buffering between channels.

Circuit 200 processes ADC samples from ADC 214 sequentially while managing coefficient accumulation in parallel. When invalid samples are detected, the coefficient accumulator 206 maintains a running sum of coefficients while the zero-value path prevents the invalid samples from affecting the output. Upon detecting the first valid sample, the accumulated coefficients are applied in a single multiplication operation, effectively recovering the processing that would have occurred during the invalid period.

In embodiments, the first multiplexer 202 and the second multiplexer 204 are controlled by a first select signal ($SEL\_1$) and a second select signal ($SEL\_2$). The first select signal controls coefficient path selection, switching the first multiplexer 202 to select the accumulated coefficient value from coefficient accumulator 206 only when the first valid ADC sample is detected after a period of invalid data. The first select signal switches the first multiplexer 202 for subsequent valid samples to select the direct coefficient input path. The second select signal is generated based on ADC data validity detection, switching the second multiplexer 204 to select the zero input when ADC samples from the ADC 214 reach saturation levels.

The coefficient accumulator 206 sums consecutive coefficient values (COEFF) when ADC data is invalid. The coefficient accumulator 206 includes a feedback path that enables successive addition of coefficient values during invalid data periods. The feedback path enables continuous operation while maintaining the running sums needed for the coefficient accumulation.

In one or more embodiments, the coefficient values (COEFF) may represent various filter responses. For example, in IQ signal processing implementations, circuit 200 may be duplicated with one instance processing in-phase components using sine wave coefficients and another processing quadrature components using cosine wave coefficients. The coefficient values may be normalized based on hardware requirements, for example, within 8-bit or 9-bit representations.

The second multiplexer 204 selects between ADC data and the zero-value input based on the validity of the input data. When ADC data is determined invalid, such as when reaching saturation levels, the second multiplexer 204 selects the zero-value input. When valid ADC data is detected, the second multiplexer 204 selects the ADC data path.

The multiplier 208 receives outputs from the first multiplexer 202 and the second multiplexer 204 and performs multiplication operations. During periods of invalid ADC data, the multiplication with zero values results in zero outputs, while the coefficient accumulator 206 continues to sum coefficient values. When the first valid ADC data arrives, the multiplier 208 combines this data with the accumulated coefficients from coefficient accumulator 206.

The accumulator 210 sums the products from multiplier 208 over time, and the results are stored in output register 212. Circuit 200 operates by selecting direct coefficient values through the first multiplexer 202 and ADC data through the second multiplexer 204 for subsequent valid ADC samples after the first valid sample.

Like the coefficient accumulator 206, accumulator 210 incorporates a feedback path for summing the products from multiplier 208 over time. The feedback path enables continuous operation while maintaining the running sums needed for output generation.

In one or more embodiments, circuit 200 maintains continuous operation without requiring additional data buffers by accumulating coefficients during invalid periods and applying them when valid data becomes available. This approach enables parallel processing across multiple channels while managing scenarios where different channels may experience varying patterns of valid and invalid data.

In embodiments, ADC data validity is determined by comparing ADC samples against a saturation threshold. For example, in an 8-bit ADC implementation, the maximum value is 256, and samples approaching this maximum, such as values of 254 or 255, may indicate signal saturation. Such saturated samples are considered invalid data that require special handling by circuit 200.

Invalid ADC data may occur due to various interference sources. In embodiments where device 100 receives wireless charging, the electromagnetic fields generated during charging may cause signal saturation in some channels of the touch-sensing layer 108. The saturation may affect different channels at different times, creating varying patterns of valid and invalid data across the parallel processing channels.

In embodiments, the initial ADC samples from a channel may be invalid due to interference present at system startup. Traditional approaches pause processing or implement data buffering until valid samples become available. Circuit 200 addresses these scenarios by maintaining operation through zero substitution while preserving coefficient information through accumulation, enabling continuous processing without additional buffer storage.

In embodiments, circuit 200 operates within a defined clock domain, with the coefficient accumulator 206, accumulator 210, and output register 212 updating their values based on clock cycles. The feedback paths in both accumulators can enable value updates on each clock cycle while maintaining previous accumulated values.

In embodiments, circuit 200 includes reset functionality to initialize the coefficient accumulator 206, accumulator 210, and output register 212 to known states. The initialization can occur at system startup or when transitioning between different processing modes.

In various embodiments, circuit 200 may be implemented in pairs to process in-phase (I) and quadrature (Q) signal components for frequency detection. A first instance of circuit 200 can process ADC samples using sine wave coefficients to generate the in-phase component, while a parallel instance can process the same ADC samples using cosine wave coefficients to generate the quadrature component. For example, when detecting a 200 kHz signal, the coefficient values represent sampled points of 200 kHz sine and cosine waves.

The parallel processing of I and Q components enables detection of signal magnitude and phase information. When an input signal contains a frequency component matching the coefficient frequency (e.g., 200 kHz), the accumulated products reach maximum values in both I and Q paths. The relative magnitudes of the I and Q accumulator outputs indicate the phase relationship between the input signal and the reference coefficients.

In embodiments where initial ADC samples are invalid, both I and Q processing paths accumulate their respective coefficients independently. When the first valid ADC sample arrives, each path multiplies this sample with its accumulated coefficients (sine coefficients for I path, cosine coefficients for Q path). This maintains proper phase relationships despite the presence of invalid samples at the beginning of the sequence.

After processing the first valid sample, both I and Q paths transition to normal operation, directly multiplying subsequent valid ADC samples with individual sine and cosine coefficients respectively. The parallel architecture maintains continuous processing across both paths while preserving the phase relationships necessary for accurate frequency detection, even when handling invalid samples through zero substitution and coefficient accumulation.

In various embodiments, coefficient values are normalized within 8-bit or 9-bit representations to optimize hardware implementation while maintaining adequate signal resolution. The selection of these bit widths aligns with common digital design practices where powers of 2 (such as 256 for 8-bit values) enable efficient hardware implementation. For example, using 8-bit coefficient values allows representation from −256 to +255, providing sufficient dynamic range for sine and cosine wave coefficients while maintaining reasonable hardware complexity.

The coefficient normalization process considers the hardware constraints and signal processing requirements. When implementing sine and cosine coefficients, the maximum amplitude values are scaled to fit within the selected bit width while preserving the relative relationships between coefficient values. This scaling ensures that multiplication results remain within manageable ranges while maintaining sufficient numerical precision for accurate frequency detection.

In embodiments where coefficients are accumulated during invalid sample periods, the accumulator width can be configured to accommodate the maximum possible sum without overflow. For example, if three consecutive coefficients need to be accumulated, the accumulator width accounts for the maximum possible sum of three 8-bit or 9-bit values. This ensures that coefficient information is preserved accurately during accumulation periods while maintaining efficient hardware utilization.

The normalized coefficient values can be stored in memory and retrieved systematically during processing operations. The normalization scheme enables efficient multiplication operations while providing adequate resolution for distinguishing signal characteristics in the touch detection system. This approach balances processing accuracy with hardware resource utilization, which can particularly advantageous when implementing multiple parallel channels, each requiring its own coefficient processing path.

In various embodiments, circuit 200 operates under the control of a state machine that manages coefficient fetching and processing sequences. The state machine can implement a counter-based approach for retrieving coefficient values from memory in a systematic order. For example, when processing ADC samples for frequency detection, the counter sequences through coefficient addresses fetch the appropriate sine or cosine values for each processing cycle.

The state machine can coordinate the timing relationships between coefficient fetching, ADC sample processing, and accumulator updates. The counter can advance on each clock cycle to fetch the next coefficient value for processing with the corresponding ADC sample. When invalid samples are detected, the state machine can maintain the coefficient fetching sequence while directing the values to the coefficient accumulator 206 rather than directly to multiplier 208.

In embodiments, the state machine implements the complete sequence of coefficient fetching and processing operations before resetting to handle the next set of samples. The counter-based approach ensures deterministic timing for coefficient retrieval while maintaining synchronization with ADC sample processing across all channels.

The clock domain relationships in circuit 200 are managed to ensure proper setup and hold times between coefficient fetching, multiplexer switching, and multiply-accumulate operations. The state machine generates control signals that coordinate these operations, with coefficient fetching occurring early enough in the clock cycle to meet setup time requirements for the multiplexer and multiplier stages. This timing coordination can be particularly advantageous when transitioning between invalid and valid sample processing, where coefficient accumulation seamlessly switch to direct multiplication.

Figure 3:
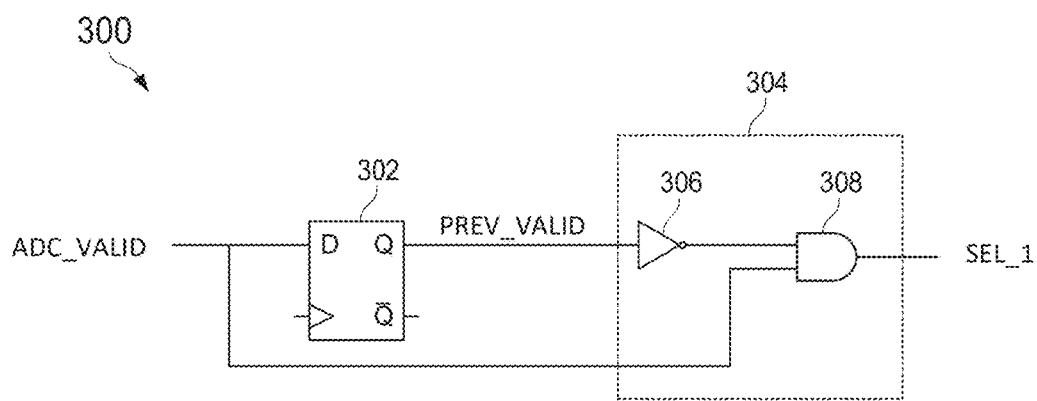
FIG. 3 is a block diagram of an embodiment select generation circuit.

FIG. 3 illustrates a block diagram of an embodiment select generation circuit 300. Select generation circuit 300 includes a flip-flop 302 and combinational logic 304, which may (or may not) be arranged as shown. Select generation circuit 300 receives an ADC validity signal (ADC_VALID) and generates a first select signal (SEL_1) for controlling the first multiplexer 202 of circuit 200.

In embodiments, flip-flop 302 stores the validity state of the previous ADC sample. It receives the ADC validity signal and outputs a previous valid signal (PREV VALID), indicating whether the previous ADC sample was valid. The flip-flop 302 updates its stored value on each clock cycle, maintaining a history of ADC sample validity.

In embodiments, the combinational logic 304 includes an inverter 306 and an AND gate 308. The inverter 306 receives the previous valid signal from flip-flop 302 and generates an inverted previous valid signal. The AND gate 308 receives the inverted previous valid signal and the current ADC validity signal, generating the first select signal (SEL_1) in response to the current ADC sample being valid and the previous sample invalid.

In an embodiment, select generation circuit 300 generates a single-cycle pulse on the first select signal in response to detecting the first valid ADC sample after a period of invalid samples. The pulse signals to the circuit 200 to select the accumulated coefficient path through the first multiplexer 202. After this first valid sample, the previous valid signal remains high, causing the inverter 306 output to be low, which forces the first select signal to remain low through AND gate 308, selecting the direct coefficient path for subsequent valid samples.

Select generation circuit 300 can operate synchronously with a system clock signal. The flip-flop 302 can sample the ADC validity signal on each rising edge of the clock, creating a one-cycle delay between the input ADC validity signal and the previous valid signal. The combinational logic 304 can generate the first select signal after propagation delays through the inverter 306 and the AND gate 308, which can be configured to meet the first multiplexer 202 setup time requirements in circuit 200. When an ADC sample transitions from invalid to valid, the first select signal asserts during the same clock cycle as the valid ADC sample, allowing the accumulated coefficients to be selected by the first multiplexer 202 concurrent with the arrival of the first valid sample.

For example, when ADC samples are initially invalid, the ADC validity signal remains low, causing flip-flop 302 to maintain a low previous valid signal. The inverter 306 output remains high during this period, but the first select signal stays low due to the low ADC validity signal input to AND gate 308. When the first valid ADC sample arrives, the ADC validity signal transitions high while the previous valid signal remains low for one more clock cycle. This creates a single-cycle window where inputs to the AND gate 308 are high, generating a one-cycle pulse on the first select signal. On the next clock cycle, flip-flop 302 updates to store the valid state, causing the inverter 306 output to go low and forcing the first select signal to remain low through AND gate 308.

Figure 4:
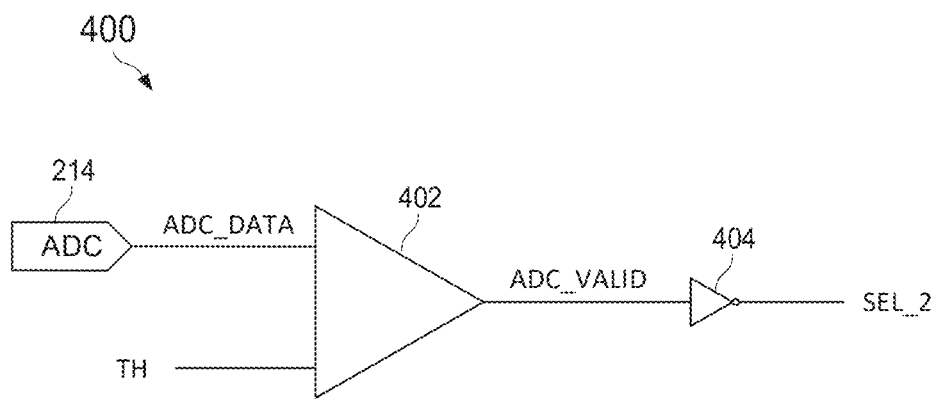
FIG. 4 is a block diagram of an embodiment select generation circuit.

FIG. 4 illustrates a block diagram of an embodiment select generation circuit 400. Select generation circuit 400 includes a comparator 402 and an inverter 404, which may (or may not) be arranged as shown. Select generation circuit 400 receives ADC data and generates a second select signal (SEL_2) for controlling the second multiplexer 204 of circuit 200.

In various embodiments, comparator 402 receives ADC data samples (ADC_DATA) from the ADC 214 and a predefined threshold value (TH). The threshold value may be programmable and set near the maximum ADC value, such as 254 for 8-bit ADC implementations. The comparator 402 compares each ADC sample against the threshold value and outputs an ADC validity signal (ADC_VALID) that indicates whether the ADC sample is below the threshold.

The inverter 404 receives the ADC validity signal from comparator 402 and generates the second select signal (SEL_2). When the ADC sample is valid (i.e., below threshold), the ADC validity signal is high, and inverter 404 outputs a low value for the second select signal, causing the second multiplexer 204 to select the ADC data path. Conversely, when the ADC sample is invalid (i.e., at or above threshold), the ADC validity signal is low, and inverter 404 outputs a high value for the second select signal, causing the second multiplexer 204 to select the zero-value input.

Select generation circuit 400 can be configured to continuously monitor incoming ADC samples and update the second select signal based on the comparison results. This enables immediate detection of signal saturation and rapid switching between ADC data and zero-value paths in circuit 200. The ADC validity signal from comparator 402 can also be provided to the select generation circuit 300 for generating the first select signal (SEL_1).

In embodiments, select generation circuit 400 operates combinationally, continuously monitoring ADC data without requiring clock synchronization. The comparator 402 can generate the ADC validity signal after a propagation delay from receiving new ADC data or threshold values. The inverter 404 can generate the second select signal after an additional small propagation delay. These combined delays can be configured to meet the second multiplexer 204 setup time requirements in circuit 200, ensuring the second select signal stabilizes before the ADC data arrives at the multiplexer input.

For example, when an ADC sample transitions from valid to invalid by exceeding the threshold, the comparator 402 output transitions low after its propagation delay. The inverter 404 then drives the second select signal high after its propagation delay, selecting the zero-value input path before the invalid ADC sample propagates through circuit 200. Similarly, when an ADC sample returns to valid levels below the threshold, the comparator 402 output transitions high, causing the second select signal to transition low and select the ADC data path in time for processing the valid sample.

In embodiments where select generation circuit 400 provides the ADC validity signal to select generation circuit 300, the propagation delays through comparator 402 ensure the validity information arrives at flip-flop 302 in time to meet its setup requirements. This timing relationship enables proper synchronization between the first select signal and the second select signal generation, allowing circuit 200 to coordinate coefficient accumulation with zero substitution when processing invalid ADC samples.

Figure 5:
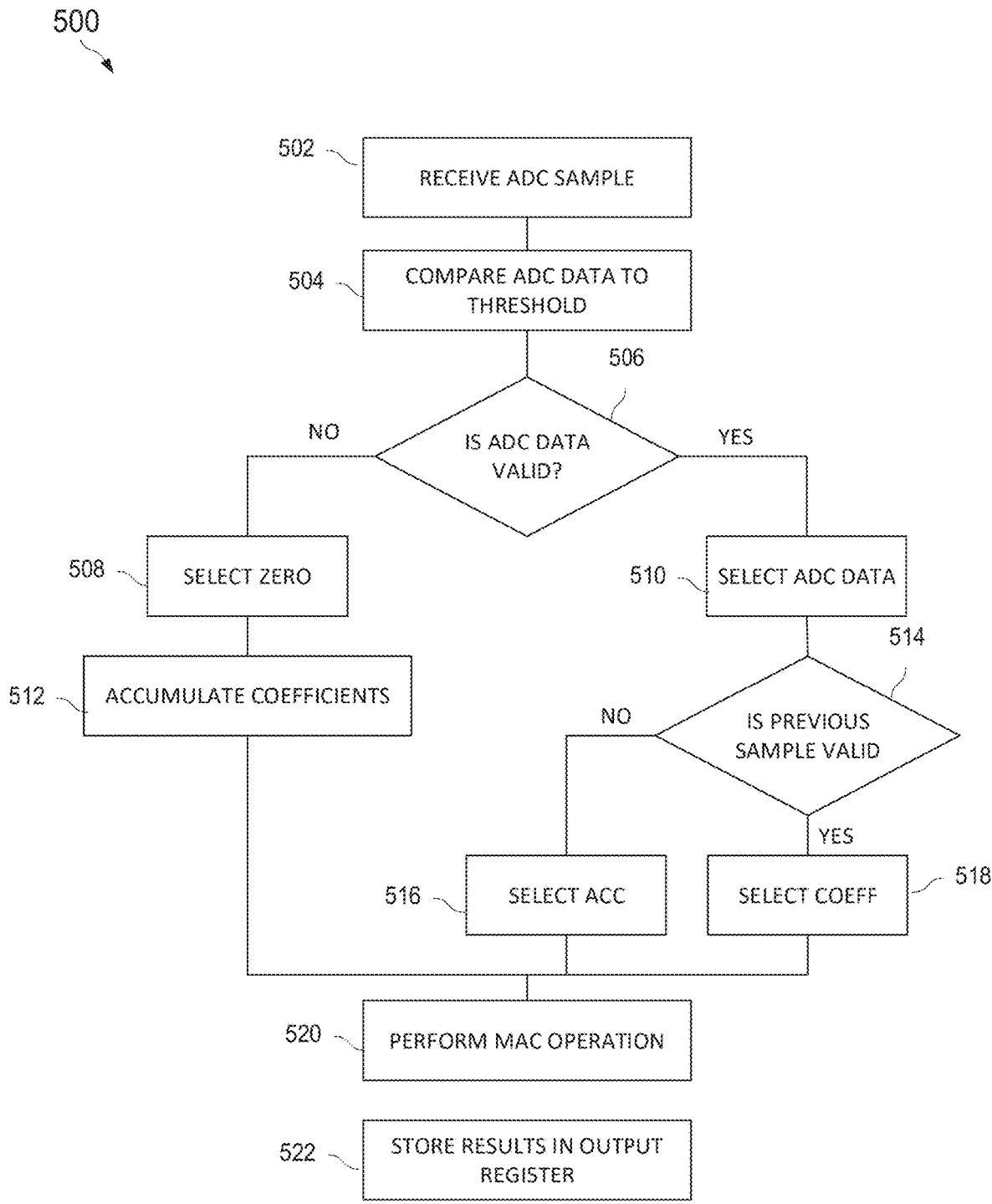
FIG. 5 is a flowchart of an embodiment method for handling distorted samples.

FIG. 5 illustrates a flowchart of an embodiment method 500 for handling distorted samples from, for example, an ADC in a touch controller. It is noted that all steps outlined in the flowchart of method 500 are not necessarily required and can be optional. Further, changes to the arrangement of the steps, removal of one or more steps and path connections, and addition of steps and path connections are similarly contemplated.

At step 502, an ADC sample is received from one of the multiple parallel channels of the touch-sensing layer 108. The ADC sample represents a digitized measurement of capacitive coupling at a specific location on the touch sensor grid. In embodiments with wireless charging interference, these ADC samples may experience saturation effects.

At step 504, comparator 402 performs a threshold comparison operation on the received ADC sample. The threshold value may be programmable and set near the maximum ADC range, such as 254 for 8-bit ADC implementations. This comparison enables the detection of potentially saturated or distorted samples that could affect touch detection accuracy.

Step 506 represents a decision point based on the comparison result from step 504. The ADC sample is considered valid when its value falls below the threshold, indicating normal signal levels. Conversely, the sample is deemed invalid when its value equals or exceeds the threshold, suggesting possible signal saturation or interference.

At step 508, the second select signal provided to the select input of the second multiplexer 204 is driven high through inverter 404 when an invalid sample is detected. This configures the second multiplexer 204 to select the zero-value input path, effectively nullifying the impact of the invalid sample on subsequent calculations.

At step 510, the coefficient accumulator 206 begins or continues its accumulation operation. Each new coefficient value is added to the previously accumulated sum through the feedback path of coefficient accumulator 206. This accumulation serves multiple purposes: it preserves the coefficient information that would otherwise be lost during invalid sample periods, maintains the mathematical relationship between coefficients and data samples through the distributive property of multiplication, and enables recovery of the signal processing once valid data returns.

For example, in IQ signal processing implementations, the accumulated coefficients may represent the sum of multiple sine or cosine wave coefficients, maintaining the phase relationship information despite invalid samples. The coefficient accumulator 206 continues this summation process for each clock cycle where invalid samples are detected, effectively compressing multiple coefficient operations into a single accumulated value.

At step 512, in response to a valid sample, the second select signal is driven low, configuring the second multiplexer 204 to pass the ADC data through for processing.

At step 514, the previous valid signal from flip-flop 302 is examined to determine whether this is the first valid sample following a period of invalid data.

In response to identifying a first valid sample after invalid data at step 514, at step 516, the first select signal is set to high for one clock cycle. This momentarily configures the first multiplexer 202 to select the accumulated coefficient value, allowing the circuit to recover the processing that would have occurred during the invalid period.

At step 518, the first select signal is maintained low for all other valid samples, and the direct coefficient path is selected for regular operation.

At step 520, the multiply-accumulate operation is executed in multiplier 208 using the selected coefficient and ADC values. For invalid samples, the multiplication with zero produces a zero result while preserving accumulated coefficients. For the first valid sample, the multiplication combines the accumulated coefficients with the valid ADC data. For subsequent valid samples, normal coefficient multiplication occurs.

At step 522, the result of the multiply-accumulate operation is captured in output register 212. This step maintains a continuous stream of processed data while managing transitions between valid and invalid sample periods. The stored results may then be used for subsequent touch detection processing.

Method 500 executes continuously for each channel, with steps 502 through 522 operating independently and in parallel across multiple channels. This parallel processing architecture enables efficient handling of varying interference patterns across different touch sensor locations without requiring channel synchronization or data buffering.

Figure 6:
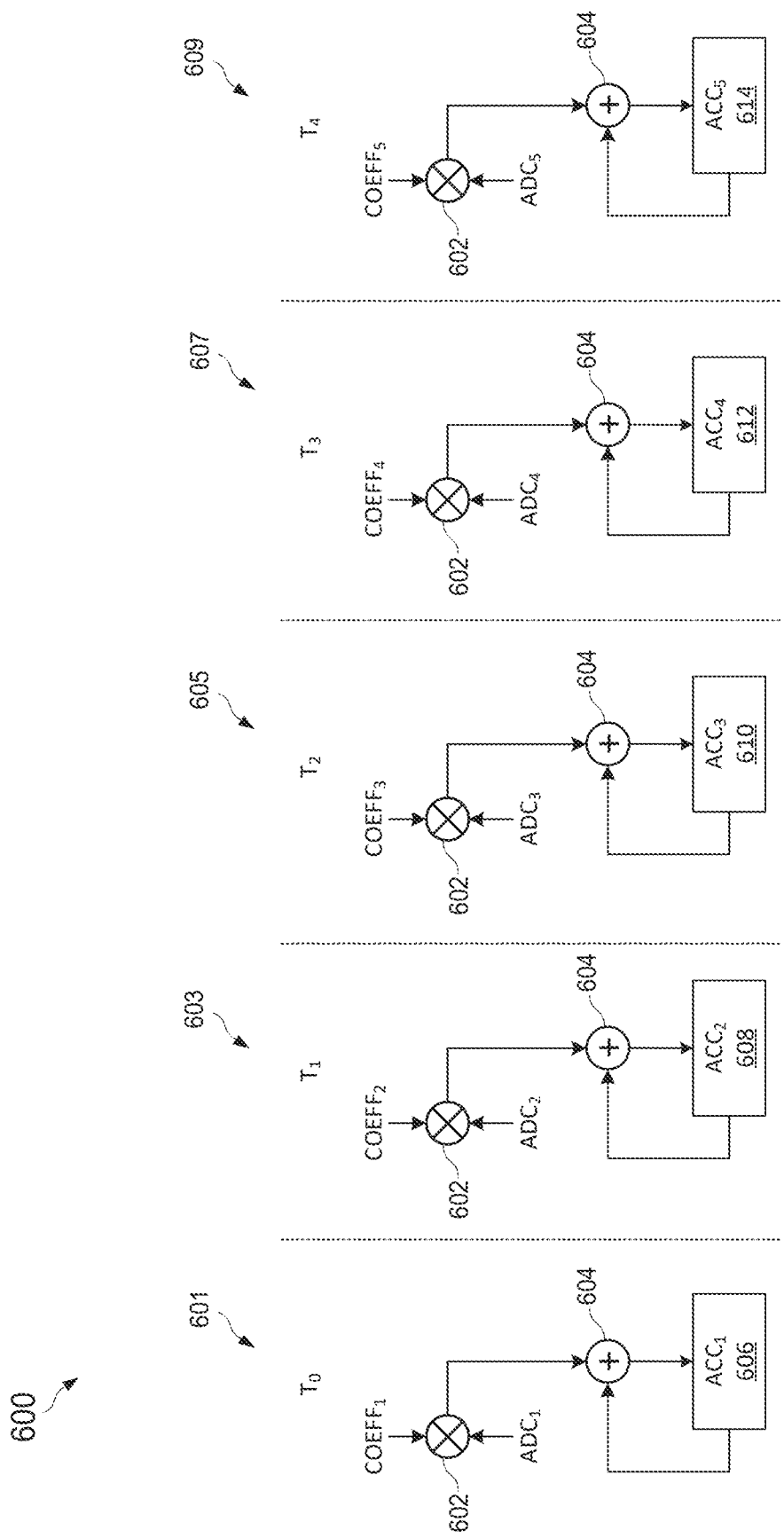
FIG. 6 is a timing diagram showing normal multiply-accumulate operations when ADC samples are valid for a single channel.

FIG. 6 illustrates a timing diagram 600 showing normal multiply-accumulate operations when ADC samples are valid for a single channel. The diagram shows five time periods 601, 603, 605, 607, and 609, labeled $T_0$ through $T_4$, representing consecutive sampling intervals during normal operation.

At time period $T_0$ 601, multiplier 602 combines the first coefficient ($COEFF_1$) with its corresponding ADC sample $ADC_1$. The product is provided to adder 604, which adds it to the current value in accumulator 606 ($ACC_1$).

During time period $T_1$ 603, the second coefficient ($COEFF_2$) is multiplied with the second ADC sample ($ADC_2$), and adder 604 combines this product with the previously accumulated value to generate the second accumulated value ($ACC_2$) in accumulator 608.

The operation continues at time period $T_2$ 605, where the third coefficient ($COEFF_3$) and the third ADC sample ($ADC_3$) are multiplied together, with their product added to the accumulated value to produce the third accumulated value ($ACC_3$) in accumulator 610.

At time period $T_3$ 607, multiplier 602 processes the fourth coefficient ($COEFF_4$) and the fourth ADC sample ($ADC_4$), with adder 604 incorporating this product into the fourth accumulated value ($ACC_4$) stored in accumulator 612.

At time period $T_4$ 608, multiplier 602 processes the fifth coefficient ($COEFF_5$) and the fifth ADC sample ($ADC_5$), with adder 604 incorporating this product into the fifth accumulated value ($ACC_5$) in accumulator 614.

The accumulators (606-614) can be employed for implementing digital filters and detecting specific signal characteristics. For example, in IQ signal processing implementations, the accumulation of coefficient-multiplied ADC samples enables detection of signal frequency and phase information.

Each product of coefficient and ADC sample represents one term in a larger filtering operation. By accumulating these products over time, the circuit implements filtering functions such as correlating the input signal against specific frequency components. In the case of sine and cosine coefficients, this accumulation produces in-phase (I) and quadrature (Q) signal components that indicate the presence and strength of particular frequencies in the touch sensor signals.

Without accumulation, the circuit would only see individual products without capturing the relationship between successive samples. The accumulation operation effectively implements the summation portion of digital filtering equations, where multiple coefficient-weighted samples are combined to extract desired signal characteristics. This enables the touch controller to distinguish valid touch or stylus signals from noise or interference.

For example, when processing a 200 kHz signal, the accumulated products of ADC samples with 200 kHz sine and cosine coefficients produce maximum values when that frequency component is present in the input signal. The accumulation thus serves as a frequency detection mechanism, with the accumulated value indicating the strength of correlation between the input signal and the coefficient sequence.

This timing diagram represents ideal operation when no external interference or signal saturation is present, allowing each ADC sample to be directly processed with its corresponding coefficient. The continuous flow of valid data enables straightforward multiply-accumulate operations without requiring special handling or coefficient accumulation.

Figure 7:
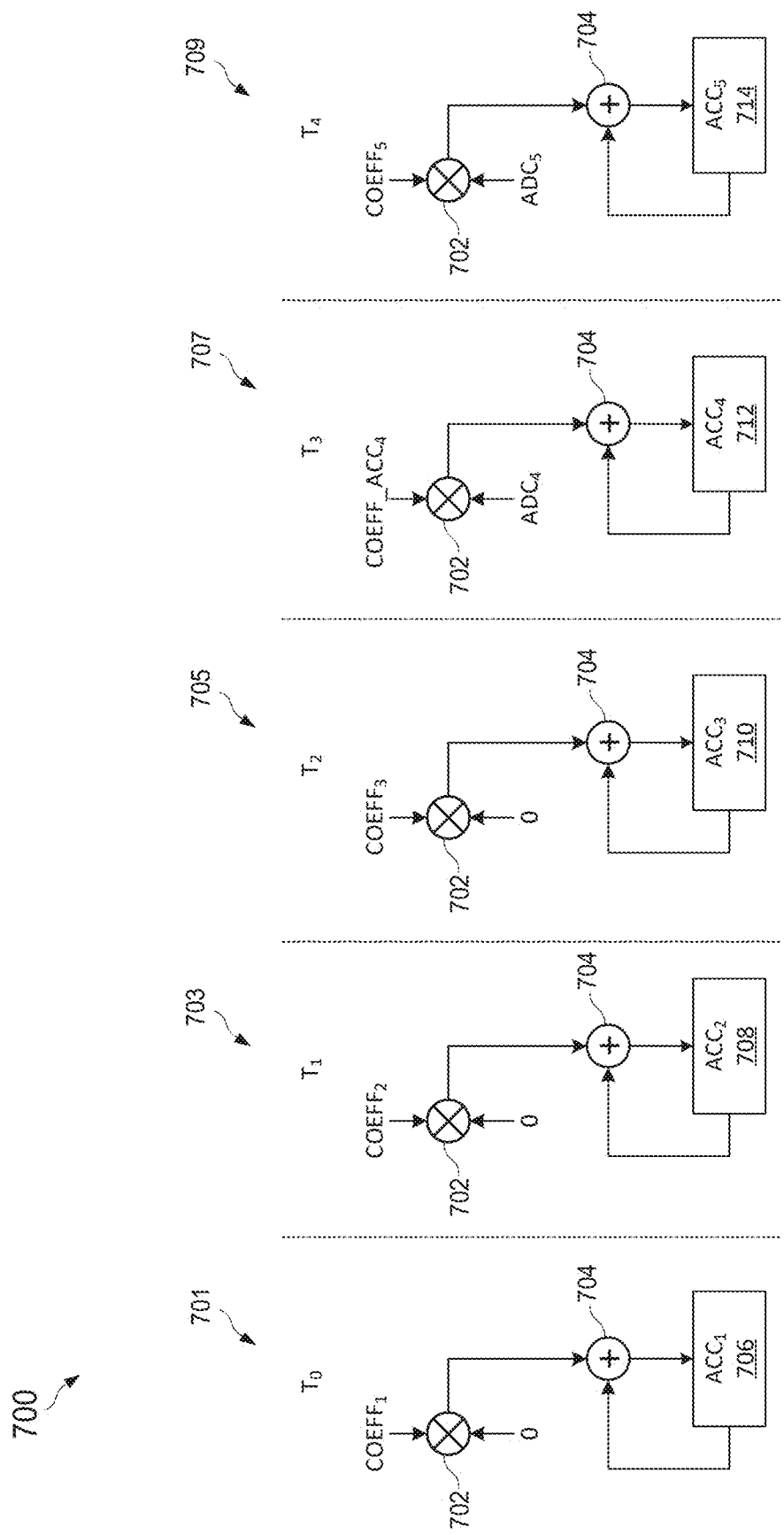
FIG. 7 illustrates a timing diagram showing multiply-accumulate operations when initial ADC samples are invalid.

FIG. 7 illustrates a timing diagram 700 showing multiply-accumulate operations when initial ADC samples are invalid. The diagram shows five time periods 701, 703, 705, 707, and 709, labeled $T_0$ through $T_4$, demonstrating how circuit 200 handles invalid data through coefficient accumulation and zero substitution.

During the first three time periods ($T_0$-$T_2$), multiplier 702 combines coefficient values ($COEFF_1$-$COEFF_3$) with zero values due to invalid ADC samples. While these multiplications result in zero outputs, adder 704 and accumulators 706-710 maintain a running sum of the coefficient values through their feedback paths.

At time period $T_3$ 707, the first valid ADC sample ($ADC_4$) arrives. At this point, multiplier 702 combines the first valid ADC sample ($ADC_4$) with the accumulated sum of the previous three coefficients (COEFF_ACC4=COEFF1+COEFF2+COEFF3). This multiplication effectively recovers the processing that would have occurred during the invalid periods. The product is then accumulated in the fourth accumulated value ($ACC_4$) 712.

By time period $T_4$ 709, the circuit returns to normal operation, with multiplier 702 processing the fifth coefficient ($COEFF_5$) with the fifth ADC sample ($ADC_5$) directly, and the result accumulated in the fifth accumulated value ($ACC_5$) 714. This demonstrates how the architecture maintains continuous operation through invalid periods while preserving signal processing accuracy through coefficient accumulation.

This timing diagram illustrates the advantage of the coefficient accumulation approach-enabling continuous processing without requiring data buffers to store invalid samples. The mathematical equivalence is maintained through the distributive property, where multiplying a sum of coefficients with a single valid sample produces the same result as summing individual coefficient-sample products (i.e., $(ADC_4 \times COEFF_1)+(ADC_4 \times COEFF_2)+(ADC_4 \times COEFF_3)+(ADC_4 \times COEFF_4)=ADC_4 \times (COEFF_1+COEFF_2+COEFF_3+COEFF_4)$).

A first aspect relates to a method for continuous processing of signals in a touch controller, the method comprising receiving analog-to-digital converter (ADC) samples from multiple parallel channels; comparing, for each channel, each ADC sample to a saturation threshold to determine validity; in response to detecting, for each channel, initial ADC samples exceeding the saturation threshold: selecting a zero value for multiplication to maintain continuous processing without buffering, and accumulating coefficient values in a coefficient accumulator; in response to detecting, for each channel, a first valid ADC sample below the saturation threshold: selecting the first valid ADC sample for multiplication, and selecting an accumulated coefficient value from the coefficient accumulator to recover processing from the initial invalid samples; and performing multiplication using the first valid ADC sample and the accumulated coefficient value to maintain equivalence through a distributive property.

In a first implementation form of the method, according to the first aspect as such, receiving ADC samples comprises receiving samples from multiple parallel channels, each channel providing continuous ADC samples representing capacitive measurements from different locations on a touch sensor matrix.

In a second implementation form of the method, according to the first aspect as such or any preceding implementation form of the first aspect, the method further comprising maintaining continuous operation without buffering, the maintaining continuous operation without buffering comprising: performing zero-value multiplications during invalid sample periods while accumulating coefficients in parallel; and applying accumulated coefficients when valid data becomes available.

In a third implementation form of the method, according to the first aspect as such or any preceding implementation form of the first aspect, the method further comprising after performing multiplication using the first valid ADC sample and the accumulated coefficient value selecting subsequent ADC samples for multiplication; and selecting individual coefficient values instead of accumulated coefficient values.

In a fourth implementation form of the method, according to the first aspect as such or any preceding implementation form of the first aspect, the method further comprising processing in-phase components using sine wave coefficients in a first processing path; and processing quadrature components using cosine wave coefficients in a second processing path.

In a fifth implementation form of the method, according to the first aspect as such or any preceding implementation form of the first aspect, the method further comprising operating within a defined clock domain; updating coefficient values and accumulator values based on clock cycles; and maintaining timing relationships between coefficient processing and ADC sample processing.

In a sixth implementation form of the method, according to the first aspect as such or any preceding implementation form of the first aspect, comparing each ADC sample comprises comparing the ADC sample against a programmable threshold value near a maximum ADC value; and generating an ADC validity signal based on the comparison.

A second aspect relates to a touch sensing system, comprising a touch sensor configured to sense inputs to a touch screen; and a touch controller coupled to receive sensed inputs from the touch sensor, the touch controller comprising first and second processing circuits, each processing circuit comprising a coefficient input node configured to receive coefficient values; a coefficient accumulator; a first multiplexer having a first input coupled to the coefficient input node, a second input coupled to an output of the coefficient accumulator, a selection input coupled to receive an ADC validity signal; an ADC input node coupled to receive the sensed inputs; a second multiplexer having a first input coupled to the ADC input node, a second input coupled to a zero value source, a selection input coupled to receive the ADC validity signal; and a multiplication circuit having a first input coupled to an output of the first multiplexer, and a second input coupled to an output of the second multiplexer, wherein the first processing circuit provides coefficient values for determining a magnitude of the sensed inputs and the second processing circuit provides coefficient values for determining a phase of the sensed inputs.

In a first implementation form of the touch sensing system, according to the second aspect as such, the touch controller processes a plurality of parallel channels simultaneously.

In a second implementation form of the touch sensing system, according to the second aspect as such or any preceding implementation form of the second aspect, the coefficient accumulator includes a feedback path enabling successive addition of coefficient values during invalid data periods.

In a third implementation form of the touch sensing system, according to the second aspect as such or any preceding implementation form of the second aspect, the selection inputs transition from selecting accumulated coefficient values to selecting individual coefficient values after processing a first valid ADC sample.

In a fourth implementation form of the touch sensing system, according to the second aspect as such or any preceding implementation form of the second aspect, the touch sensing system further comprising a comparator circuit configured to compare ADC samples against a programmable threshold value; and an inverter configured to generate the ADC validity signal based on the comparison.

In a fifth implementation form of the touch sensing system, according to the second aspect as such or any preceding implementation form of the second aspect, wherein the first processing circuit processes in-phase components using sine wave coefficients and the second processing circuit processes quadrature components using cosine wave coefficients, wherein the first and second processing circuits accumulate their respective coefficients during invalid data periods, wherein the first and second processing circuits multiply their respective accumulated coefficients with a first valid ADC sample, and wherein the first and second processing circuits transition to using individual coefficients for subsequent valid samples.

In a second implementation form of the touch sensing system, according to the second aspect as such or any preceding implementation form of the second aspect, the touch sensing system further comprising a state machine configured to control coefficient fetching and processing sequences across the first and second processing circuits.

A third aspect relates to a circuit for processing ADC samples, the circuit comprising a coefficient input node configured to receive coefficient values; a coefficient accumulator; a first multiplexer having a first input coupled to the coefficient input node, a second input coupled to an output of the coefficient accumulator, and a selection input coupled to receive an ADC validity signal; an ADC input node providing ADC samples; a second multiplexer having a first input coupled to the ADC input node, a second input coupled to a zero value source, and a selection input coupled to receive the ADC validity signal; and a multiplication circuit having a first input coupled to an output of the first multiplexer, and a second input coupled to an output of the second multiplexer, wherein the selection inputs control the first multiplexer and the second multiplexer to select a zero value and coefficient values when the ADC validity signal indicates an invalid sample, and select a first valid ADC sample and the accumulated coefficient value when the ADC validity signal indicates a first valid sample.

In a first implementation form of the circuit, according to the third aspect as such, the coefficient accumulator comprises a feedback path enabling successive addition of coefficient values during invalid sample periods.

In a second implementation form of the circuit, according to the third aspect as such or any preceding implementation form of the third aspect, the multiplication circuit comprises a multiplier coupled to an accumulator; the accumulator includes a feedback path for summing products from the multiplier over time; and the accumulator is configured to accommodate sums of multiple coefficient values during invalid sample periods.

In a third implementation form of the circuit, according to the third aspect as such or any preceding implementation form of the third aspect, multiple instances of the circuit operate in parallel to process multiple channels simultaneously.

In a fourth implementation form of the circuit, according to the third aspect as such or any preceding implementation form of the third aspect, a first instance of the circuit processes in-phase components using sine wave coefficients; and a second instance of the circuit processes quadrature components using cosine wave coefficients.

In a fifth implementation form of the circuit, according to the third aspect as such or any preceding implementation form of the third aspect, the circuit further comprising a state machine configured to implement a counter-based approach for retrieving coefficient values from memory, and coordinate timing relationships between coefficient fetching, ADC sample processing, and accumulator updates.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method for continuous processing of signals in a touch controller, the method comprising:
 receiving analog-to-digital converter (ADC) samples from multiple parallel channels;
 comparing, for each channel, each ADC sample to a saturation threshold to determine validity;
 in response to detecting, for each channel, initial ADC samples exceeding the saturation threshold:
  selecting a zero value for multiplication to maintain continuous processing without buffering, and
  accumulating coefficient values in a coefficient accumulator;
 in response to detecting, for each channel, a first valid ADC sample below the saturation threshold:
 selecting the first valid ADC sample for multiplication, and
  selecting an accumulated coefficient value from the coefficient accumulator to recover processing from the initial invalid samples; and
 performing multiplication using the first valid ADC sample and the accumulated coefficient value to maintain equivalence through a distributive property.

2. The method of claim 1, wherein receiving ADC samples comprises receiving samples from multiple parallel channels, each channel providing continuous ADC samples representing capacitive measurements from different locations on a touch sensor matrix.

3. The method of claim 1, further comprising maintaining continuous operation without buffering, the maintaining continuous operation without buffering comprising:
 performing zero-value multiplications during invalid sample periods while accumulating coefficients in parallel; and
 applying accumulated coefficients when valid data becomes available.

4. The method of claim 1, further comprising, after performing multiplication using the first valid ADC sample and the accumulated coefficient value:
 selecting subsequent ADC samples for multiplication; and
 selecting individual coefficient values instead of accumulated coefficient values.

5. The method of claim 1, further comprising:
 processing in-phase components using sine wave coefficients in a first processing path; and
 processing quadrature components using cosine wave coefficients in a second processing path.

6. The method of claim 5, further comprising:
 operating within a defined clock domain;
 updating coefficient values and accumulator values based on clock cycles; and
 maintaining timing relationships between coefficient processing and ADC sample processing.

7. The method of claim 1, wherein comparing each ADC sample comprises:
 comparing the ADC sample against a programmable threshold value near a maximum ADC value; and
 generating an ADC validity signal based on the comparison.

8. A touch sensing system, comprising:
 a touch sensor configured to sense inputs to a touch screen; and
 a touch controller coupled to receive sensed inputs from the touch sensor, the touch controller comprising first and second processing circuits, each processing circuit comprising:
  a coefficient input node configured to receive coefficient values;
  a coefficient accumulator;
  a first multiplexer having:
   a first input coupled to the coefficient input node,
   a second input coupled to an output of the coefficient accumulator,
   a selection input coupled to receive an ADC validity signal;
  an ADC input node coupled to receive the sensed inputs;
  a second multiplexer having:
   a first input coupled to the ADC input node,
   a second input coupled to a zero value source,
   a selection input coupled to receive the ADC validity signal; and
  a multiplication circuit having:
   a first input coupled to an output of the first multiplexer, and
   a second input coupled to an output of the second multiplexer,
 wherein the first processing circuit provides coefficient values for determining a magnitude of the sensed inputs and the second processing circuit provides coefficient values for determining a phase of the sensed inputs.

9. The touch sensing system of claim 8, wherein the touch controller processes a plurality of parallel channels simultaneously.

10. The touch sensing system of claim 8, wherein the coefficient accumulator includes a feedback path enabling successive addition of coefficient values during invalid data periods.

11. The touch sensing system of claim 8, wherein the selection inputs transition from selecting accumulated coefficient values to selecting individual coefficient values after processing a first valid ADC sample.

12. The touch sensing system of claim 8, further comprising:
 a comparator circuit configured to compare ADC samples against a programmable threshold value; and
 an inverter configured to generate the ADC validity signal based on the comparison.

13. The touch sensing system of claim 8,
 wherein the first processing circuit processes in-phase components using sine wave coefficients and the second processing circuit processes quadrature components using cosine wave coefficients,
 wherein the first and second processing circuits accumulate their respective coefficients during invalid data periods,
 wherein the first and second processing circuits multiply their respective accumulated coefficients with a first valid ADC sample, and
 wherein the first and second processing circuits transition to using individual coefficients for subsequent valid samples.

14. The touch sensing system of claim 8, further comprising a state machine configured to control coefficient fetching and processing sequences across the first and second processing circuits.

15. A circuit for processing ADC samples, the circuit comprising:
- a coefficient input node configured to receive coefficient values;
- a coefficient accumulator;
- a first multiplexer having:
  - a first input coupled to the coefficient input node,
  - a second input coupled to an output of the coefficient accumulator, and
  - a selection input coupled to receive an ADC validity signal;
- an ADC input node providing ADC samples;
- a second multiplexer having:
  - a first input coupled to the ADC input node,
  - a second input coupled to a zero value source, and
  - a selection input coupled to receive the ADC validity signal; and
- a multiplication circuit having:
  - a first input coupled to an output of the first multiplexer, and
  - a second input coupled to an output of the second multiplexer,
- wherein the selection inputs control the first multiplexer and the second multiplexer to:
  - select a zero value and coefficient values when the ADC validity signal indicates an invalid sample, and
  - select a first valid ADC sample and the accumulated coefficient value when the ADC validity signal indicates a first valid sample.

16. The circuit of claim 15, wherein the coefficient accumulator comprises a feedback path enabling successive addition of coefficient values during invalid sample periods.

17. The circuit of claim 15, wherein:
- the multiplication circuit comprises a multiplier coupled to an accumulator;
- the accumulator includes a feedback path for summing products from the multiplier over time; and
- the accumulator is configured to accommodate sums of multiple coefficient values during invalid sample periods.

18. The circuit of claim 15, wherein multiple instances of the circuit operate in parallel to process multiple channels simultaneously.

19. The circuit of claim 15, wherein:
- a first instance of the circuit processes in-phase components using sine wave coefficients; and
- a second instance of the circuit processes quadrature components using cosine wave coefficients.

20. The circuit of claim 15, further comprising a state machine configured to:
- implement a counter-based approach for retrieving coefficient values from memory, and
- coordinate timing relationships between coefficient fetching, ADC sample processing, and accumulator updates.

* * * * *